April 17, 1934.  T. W. STONE  1,955,033
AUTOMATIC CONTROL APPARATUS
Filed Feb. 14, 1930  8 Sheets-Sheet 5

INVENTOR.
Thomas W. Stone.
BY Jesse R. Langley
ATTORNEY

April 17, 1934.  T. W. STONE  1,955,033
AUTOMATIC CONTROL APPARATUS
Filed Feb. 14, 1930  8 Sheets-Sheet 7

INVENTOR.
Thomas W. Stone.
BY Jesse R. Langley
ATTORNEY.

Patented Apr. 17, 1934

1,955,033

UNITED STATES PATENT OFFICE 1,955,033

AUTOMATIC CONTROL APPARATUS

Thomas W. Stone, Fort Wayne, Ind., assignor to The Western Gas Construction Company, a corporation of Indiana Application February 14, 1930, Serial No. 428,345

21 Claims. (Cl. 48—83)

My invention relates to a control mechanism for automatically timing the operation of gas making machines that operate on intermittent cycles. In particular it relates to a type of control mechanism having a plurality of independent endless chains, each of which controls a separate event in the cycle.

Heretofore, one of the most successful automatic controls has been hydraulic and comprised a piston for reciprocating a valve past a plurality of ports. Adjustment of the speed of any part of the travel of the valve from port to port was easily made.

Such adjustment however influenced the total time for a complete reciprocation of the valve and, even in the absence of such adjustment, the total time of one reciprocation and hence the total length of the cycle for the gas making set under control did not remain constant.

Several types of mechanical cam and electromagnetic controls have been developed and although any of them would keep the total length of the cycle constant if driven with a synchronous motor they invariably lacked the flexibility of adjustment of individual portions of the cycle and also lacked the reliability of the hydraulic type of control.

One of the objects of the present invention is to combine the flexibility of adjustment of the hydraulic type with uniformity of speed of the mechanical and electrical types of automatic control devices.

Figure 1:
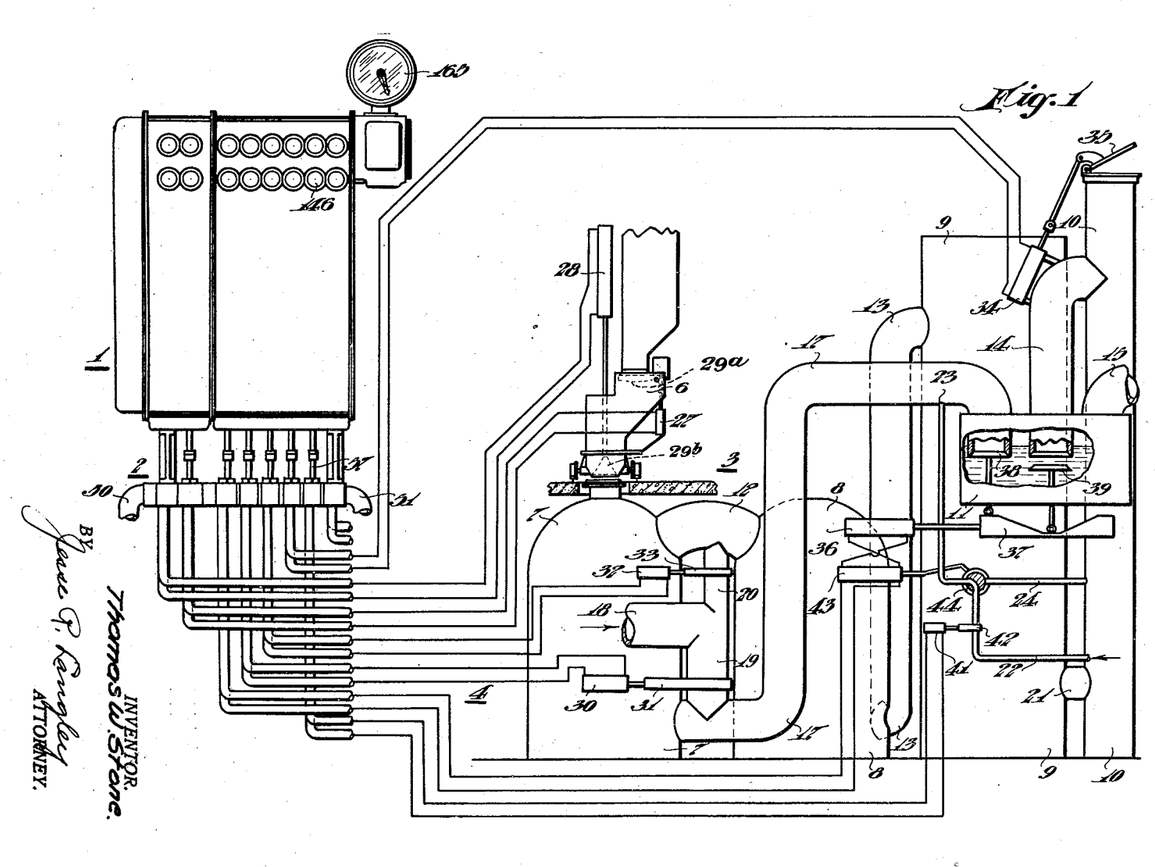
Figure 1 is a partially diagrammatic view in elevation of a gas-making machine and the automatic control apparatus of my invention connected thereto.

The apparatus of the present invention comprises a controlling and timing mechanism 1 that operates a group of four-way reversing valves 2. As shown in Fig. 1, the valves of group 2 are respectively inserted in the hydraulic lines 4 leading to the various operating valves of a water-gas set 3.

The principal parts of the water-gas set are a fuel charging machine 6, a water-gas generator 7, a combustion chamber 8, a waste heat boiler 9, a stack 10 and a tar batter 11. A pipe 12 connects the generator 7 to the combustion chamber 8 and a pipe 13 connects the combustion chamber 8 to the waste heat boiler 9.

A pipe 14 connects stack 10 to tar batter 11 and a pipe 15 leads gas from the tar batter 11 to a gas main (not shown). A back run pipe 17 connects the bottom of the generator to the tar batter.

An air blast pipe 18 supplies the set 3 with air, primary air being admitted through a pipe 19 to the bottom of the generator 7 by virtue of its connection to the lower end of backrun pipe 17. Secondary air is admitted to the upper part of the combustion chamber through a pipe 20 which opens into pipe 12.

A pipe 21 connects the bottom of the waste heat boiler 9 with the stack 10. Steam is supplied to the gas-making set 3 through a pipe 22. Steam is delivered to the generator 7 for upward passage therethrough by means of a pipe 23 connected to the backrun pipe 17 and is delivered to the generator 7 for downward passage therethrough by means of a pipe 24 connected to the stack 10.

A modern water-gas set, of which the one shown in Fig. 1 may be taken as a typical example, operates on a cycle that includes periods during which air is blasted through a fuel bed supported within the generator, the resultant products of combustion allowed to escape to the atmosphere and periods during which steam is run through the fuel bed in the generator, the resultant water gas being led into a gas main for use as fuel or illuminating gas.

The water-gas set shown in Fig. 1 is provided with a plurality of hydraulic cylinders, enumerated below, for actuating the various operating valves of the water-gas set. A typical length for a cycle would be three minutes.

A hydraulic cylinder 27 opens an inlet door 29a to admit a weighed amount of coal into the charger 6 once during each cycle. A hydraulic cylinder 28 lowers a charging valve 29b into the generator 7 at a time during each cycle when the inlet door 29a is closed for the purpose of depositing fuel on the fuel bed (not shown) in the generator.

During one portion of the cycle a hydraulic cylinder 30, by means of a conventional gate valve 31, admits primary air through the primary air inlet 19 beneath the fuel bed in the generator 7. During the upward passage of the primary air through the fuel bed some combustible gases are formed along with the gases of combustion. At this time a hydraulic cylinder 32 operates a gate valve 33 to admit secondary air through the secondary air inlet 20 to the top of the combustion chamber 8 to unite with the combustible portion of the gases. During this time a hydraulic cylinder 34 holds a stack valve 35 open to discharge the products of combustion of the air blast gases.

In the meantime a hydraulic cylinder 36 keeps a cam 37 in the right hand position as shown in Fig. 1 so that tar batter valves 38 and 39 are in such positions that valve 38 closes the end of backrun pipe 17 while the pipe 14 is sealed by the liquid in the tar batter 11. While the valves are in the above recited positions, the set is said to be in the blow period of the cycle and the fuel bed in the generator 7 and the checkerbrick in combustion chamber 8 are intensely heated while considerable steam is generated in waste heat boiler 9.

At the end of the blow period valves 31, 33 and 35 are closed by their respective hydraulic cylinders. A hydraulic cylinder 41 opens an "off-and-on" steam valve 42. When the cam 37 is keeping valve 38 closed a hydraulic cylinder 43 keeps a three-way valve 44 in such position that steam from the pipe 22 is directed into the steam pipe 23. This is brought about by operating cylinder 43 from the same pair of hydraulic pipes 4 that operate the hydraulic cylinder 36.

Steam now passes upwardly through the fuel bed in the generator 7 by means of steam pipe 23 generating water gas while passing through the fuel bed; and the resultant water gas passes through pipe 14 into tar batter 10 because valve 39 at this time is open. The above is called the uprun portion of the gas-making cycle.

The uprun portion of the cycle is changed to the succeeding downrun portion of the cycle by reversal of the position of valves 38 and 39 and also by reversal of the position of the three-way valve 44. Steam then passes through backrun steam inlet 24 to the stack 10. Valve 39 at this time is closed so the steam passes in a reverse direction upward through the waste heat boiler 9, upward through the combustion chamber 8, downward through the fuel bed in generator 7 and through backrun pipe 17 into the tar batter 10 through valve 38 which at this time is open. The cam 37 and three-way valve 44 are moved simultaneously because the cylinders 36 and 43 are interconnected with short pipes, shown crossed in Fig. 1.

While a typical cycle of a modern backrun gas-making set is largely composed of the three periods above described there are also minor periods such as purge periods and blow run periods. While the main portions of the cycle only necessitate the movement of the several hydraulic cylinders backward and forward once during each cycle, the same is not true of the minor portions of the cycle. Purges, blow runs, etc., often necessitate opposite movements of the same hydraulic cylinder twice during the one cycle as will be referred to later.

Figure 2:
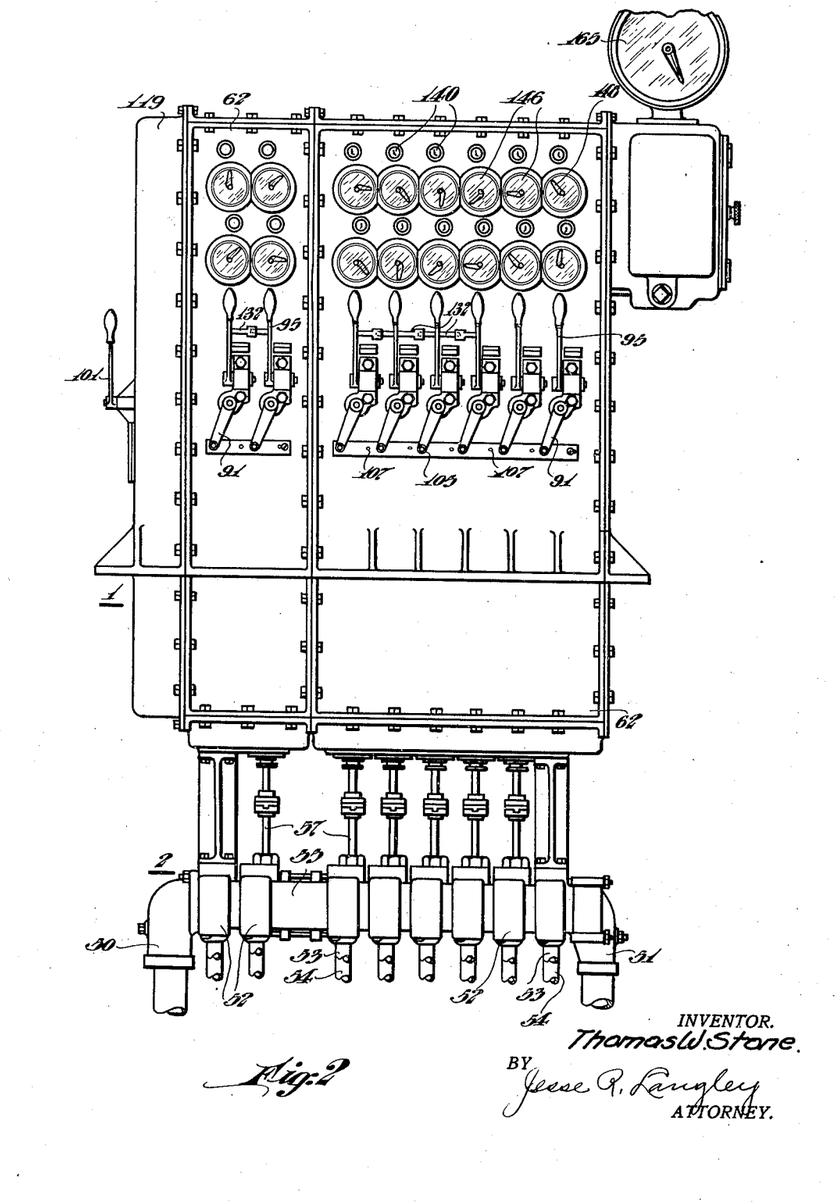
Fig. 2 is an elevation of the automatic control apparatus.
Figure 3:
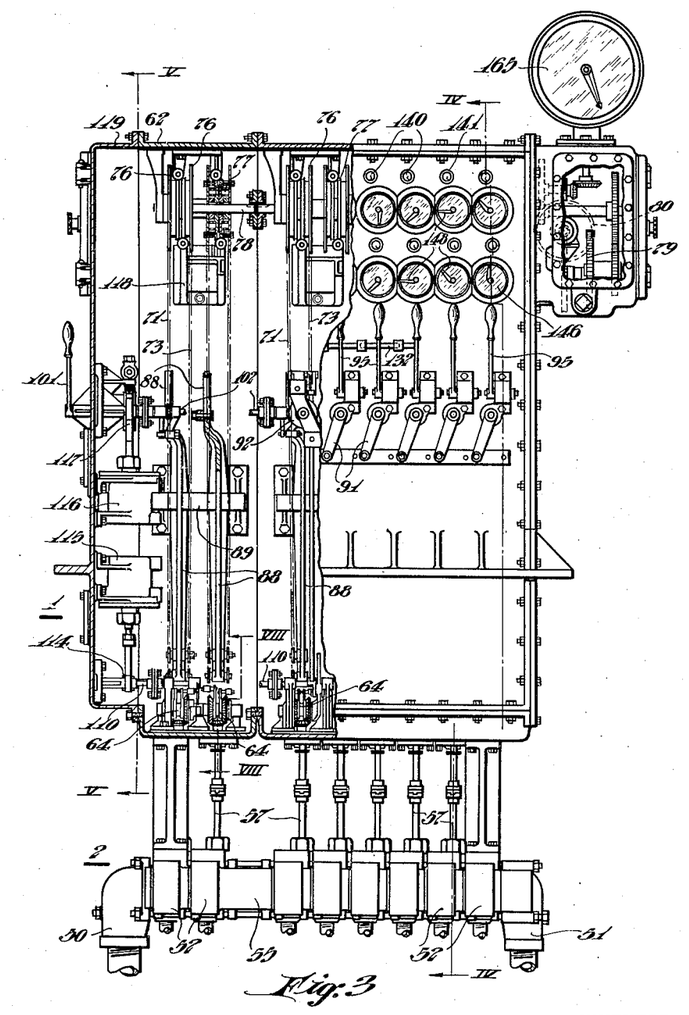
Fig. 3 is an elevational view partly in cross section of the control apparatus.

The group of four-way reversing valves 2 has a single inlet port 50 and a single exhaust port 51, as shown in Figs. 2 and 3. The group is made up of a plurality of individual valves 52.

Figure 4:
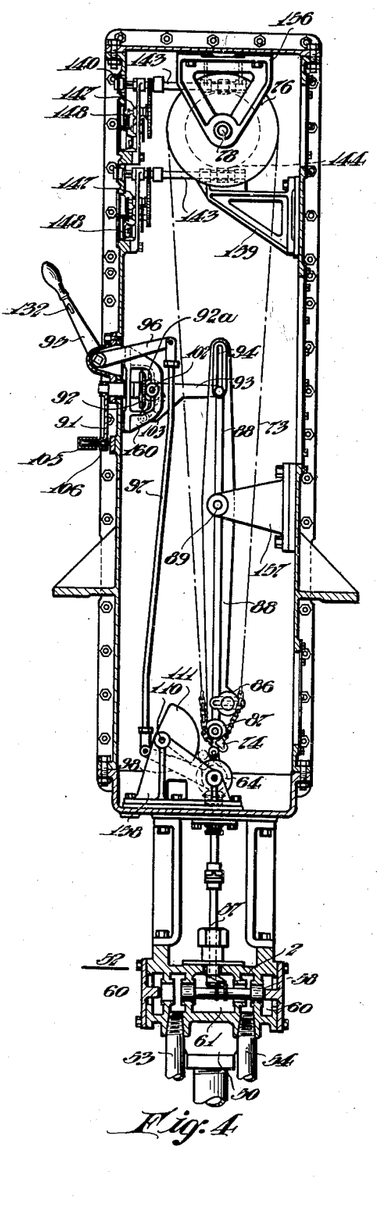
Fig. 4 is a section on line IV—IV of Fig. 3.

Each valve 52 is provided with a pipe 53 as shown in Fig. 4 for supplying fluid to one end of one of the hydraulic cylinders that forms part of the gas-making set 3. Each valve 52 is also provided with a pipe 54 that is connected to the opposite end of the corresponding hydraulic cylinder just mentioned. The casting 55 shown in Figs. 2 and 3 is a mere spacer or filler for the continuation of the inlet and the exhaust ports through the group of valves 2.

Each valve 52 is provided with a rotatable valve stem 57 for reciprocating a piston valve 58, shown in Fig. 4. The passageways 60 at the outer ends of the valve casing of each valve 52, as shown in Fig. 4 are in communication with the inlet high pressure supply port 50 and the passageway 61 in the center of the casing of each valve is in communication with the low pressure or exhaust port 51.

Each valve stem 57 is turned by corresponding portions of the mechanism 1. The mechanism 1 not only turns each stem 57 but correctly times such turning to keep the various operations of the gas-making set in proper sequence for carrying out the above mentioned cycle.

The mechanism 1 comprises a casing 62 inside the lower part of which is a plurality of gear mechanisms or assemblies 63 and 64, each of which turns one of the valve stems 57. "Special" mechanisms 63 shown in Figs. 7, 8 and 9 differ slightly from "standard" mechanisms 64 shown in Fig. 10 as will become evident. Each valve stem 57 is provided with either an assembly 63 or an assembly 64 but not both.

As shown in Figs. 7 to 10, inclusive, each mechanism 63 and 64 comprises a bevel gear 65 keyed to the upper end of the valve stem 57 and which is engaged by a bevel gear 66 carrying an arm 67 and a similar gear 68 provided with an arm 69.

Above each of the assemblies 63 and 64 and extending the full height of the large casing 62 is located an endless chain 71 with the projecting roller cam 72 mounted thereon and also an endless chain 73 with a roller cam 74 mounted thereon.

The roller cam 72 engages and moves arm 67 and gear 66 for turning the corresponding valve stem 57 by means of gear 65 for operating the hydraulic cylinder that is connected thereto in one direction. The roller cam 74 turns the valve stem 57 in the opposite direction by means of the arm 69, gear 68 and gear 65 for operating the hydraulic cylinder in the reverse direction to that just mentioned and in the meantime restores arm 67 to its original position in the path of the roller cam 72.

The endless chains 71 and 73 or endless belts are supported at their upper ends and driven by sprocket wheels 76 that are mounted on planetary gearing assemblies 77 that are capable of differential action and are located within the upper end of the casing 62. The sprocket wheels 76 are rotated by means of the slowly revolving shaft 78, the motion being transmitted through the assemblies 77. The shaft 78 is driven through reduction gearing 79 by a motor 80.

Figures 10, 11, 12:
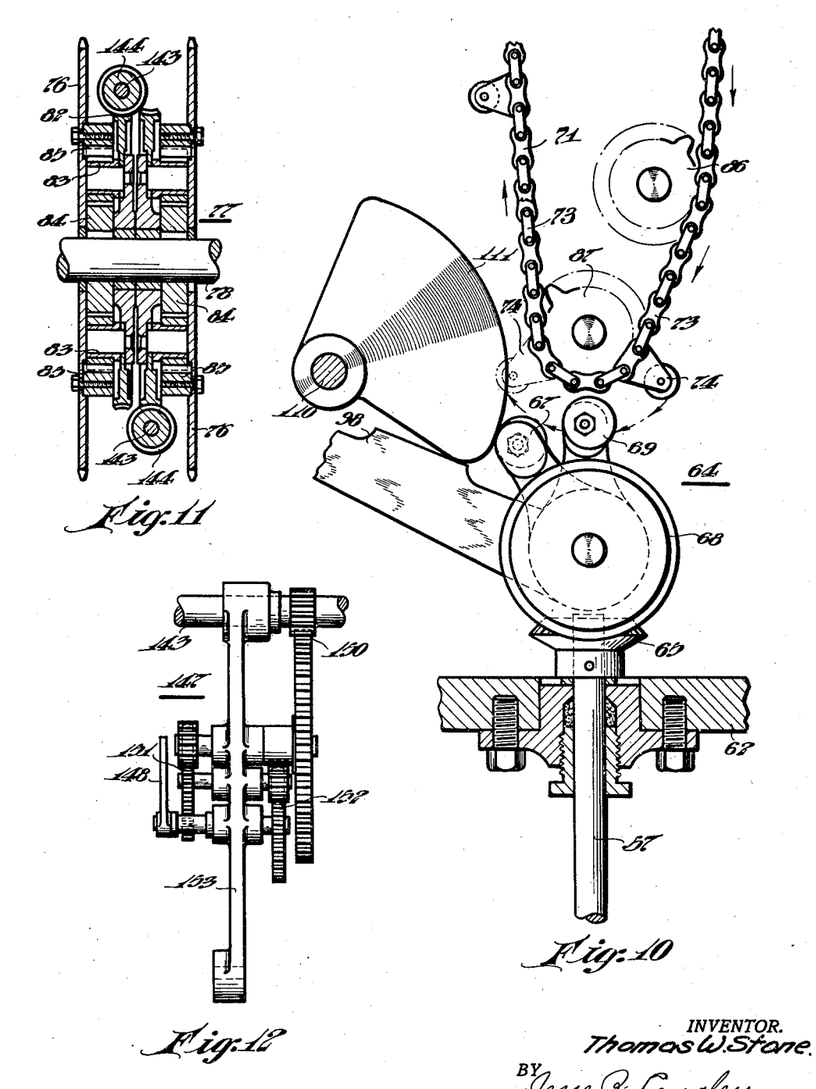
Fig. 10 is a side elevation of a valve operating mechanism that differs slightly from the one shown in Fig. 7.
Fig. 11 is a section through a differential gear mechanism.
Fig. 12 is a side elevation of a dial gearing assemblage.

Each differential assembly 77, as shown in Fig. 11, comprises a pair of normally stationary worm wheels 82 each of which has a plurality of planetary gears 83 mounted thereon. A spur gear 84 is keyed on shaft 78 opposite each set of planetary gears 83 and meshes therewith. The motion of the spur gears 84 is transmitted through gears 83 to annular ring gears 85 bolted to the flat sprocket gear 76. Each gear 85 and sprocket 76 rotate in the opposite direction to, and at a slower rate than, the spur gear 84.

The lower end of each pair of chains 71 and 73 that actuate an assembly 63 or 64 is supported by tensioning sprocket wheels 86 and sprocket wheels 87 carried by the lower end of a long lever 88. Each lever 88 is pivoted on a shaft 89 and can be swung by means of a hand lever 91. Each lever 91 acts through a bevel gear 92 and a bevel gear 92a to actuate a lever 93 which in turn engages a slot 94 in the upper end of lever 88. The displacement of the lower end of any pair of chains by tilting of its supporting lever 88 is for the purpose of preventing the corresponding roller cams 72 and 74 from engaging with the corresponding assembly 63 or 64 for turning one of the valve stems 57.

Each lever 93 is keyed to a corresponding bevel gear 92a and each of these assemblies of a lever 93 and a bevel gear 92a is supported upon and rotates freely upon a shaft 102 having a hand lever 101 at one end thereof and located at one end of the casing 62. It will thus be apparent that each of the individual hand levers 91 can be moved to raise the corresponding lever 93 and swing the corresponding lever 88 into the disengaged position of the chains 71 and 73 carried thereby without effecting the shaft 102 or handle 101.

The shaft 102, however, carries a lever 103 corresponding to each of the levers 93 and keyed to the shaft 102. The levers 103 engage the levers 93 in one direction only. Consequently, movement of the hand lever 101 by rotating the shaft 102 and the levers 103 raises all of the levers 93 not previously raised by the individual levers 91 and throws all of the levers 88 into the disengaged position.

Movement of the hand lever 101 in the opposite direction does not, however, restore the chains to the engaged or operative position because the shaft 102 is not keyed to the levers 93 and the levers 103 exert no influence upon the levers 93 when moved in this direction.

Each lever 91 is provided with a handle 105 having a spring-pressed plunger 106 which engages recess 107 in the face of the casing 62 at a point corresponding to the disengaged position of the chains 71 and 73. There are no similar recesses corresponding to the engaged position of the chains.

Figure 16:
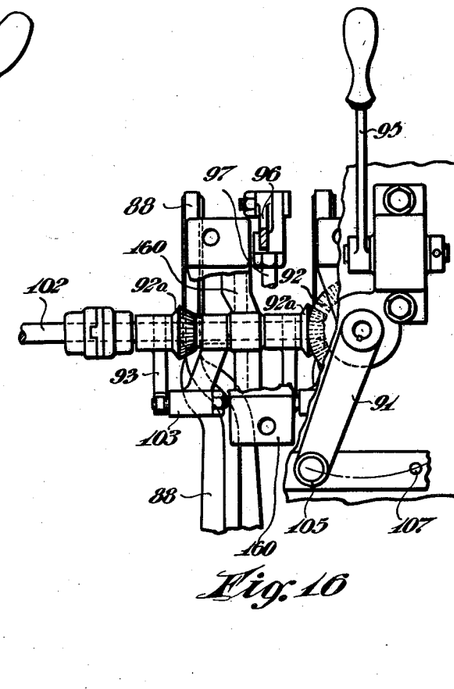

Consequently, if the lever 101 has been rotated to throw all of the pairs of chains 71 and 73 into the disengaged position, in order to restore the chains to their engaged position, it is necessary for the operator to take hold of each one of the handles 105 to pull out the corresponding pin 106 and move the individual lever 91 into the engaged position as shown in Figs. 3 and 16. This must be done individually for each pair of chains 71 and 73. It will be obvious that this is a desirable safety feature.

After any pair of chains 71 and 73 is moved out of engagement with its assembly 63 or 64, the latter can be controlled by a hand lever 95 acting through a bell crank lever 96, a long rod 97 and a lever 98 which is attached to the bevel gear 68 of each assembly 63 or 64.

Figure 9:
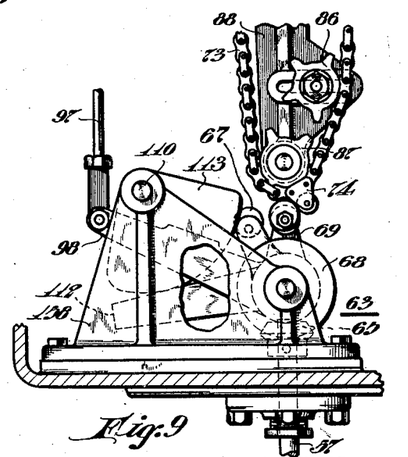
Fig. 9 is a side elevation of the same.

A cam shaft 110 is provided as shown in Figs. 3, 4 and 9 having a plurality of cams 111, one for actuating each lever 98 attached to gear 68 of each gear assembly 64. The assemblies 63 differ from the assemblies 64 in that they are provided with what may be termed "special" levers 112 attached to the bevel gears 66. The shaft 110 also carries a cam 113 for actuating the special lever 112 attached to each assembly 63.

Figure 7:
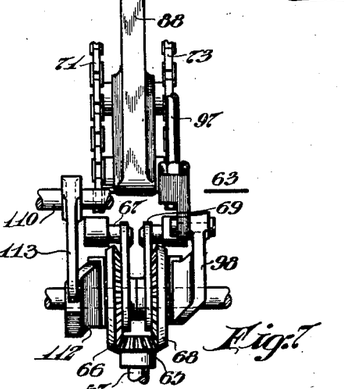
Fig. 7 is a front elevational detail of a valve operating mechanism.
Figure 8:
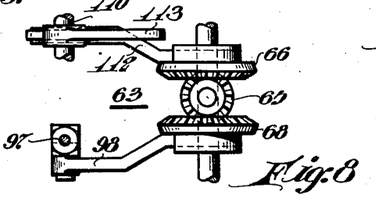
Fig. 8 is a plan view of the mechanism of Fig. 7.

The cams 113 for the assemblies 63 are placed on the left side, as viewed in Fig. 7, in alignment with the special levers 112. The reason for having both assemblies 63 and 64 is explained hereinbelow in describing the interlocking apparatus.

Upon rotation of shaft 110, each assembly 63 and 64 is moved in such direction as to bring the valve stem 57, the valve 52 and the corresponding remote hydraulic cylinder into a safe position. That is, the operating valves of the water-gas set 3 are all so positioned that explosions and other undesirable occurrences will not take place.

Figure 5:
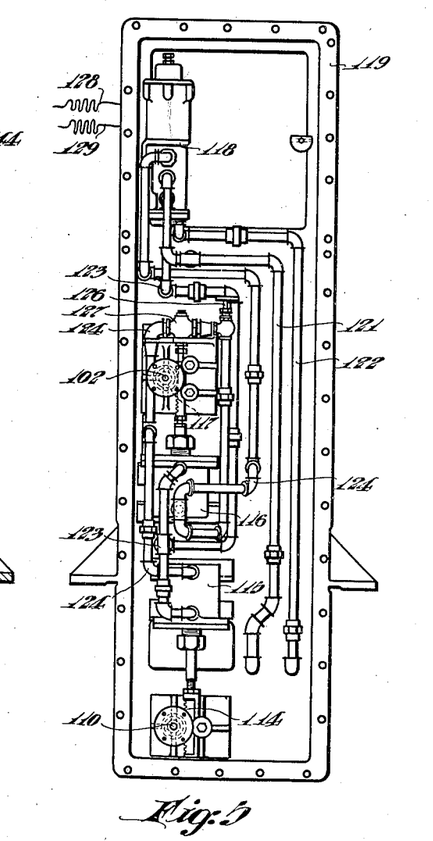
Fig. 5 is a section on lines V—V of Fig. 3.

The shaft 110 is rotated by a single rack and pinion assembly 114, shown at the left side of Fig. 3 and in the lower part of Fig. 5. The rack is moved by a hydraulic cylinder 115. There is no hand lever for rotating shaft 110.

A hydraulic cylinder 116 is located immediately above cylinder 115, and through a rack and pinion 117 rotates the shaft 102 and moves the hand lever 101 attached thereto. When the shaft 102 is rotated by the hydraulic cylinder 116, it moves all of the pairs of chains 71, 73, to an inoperative position by means of the levers 103 and 93, just as if shaft 102 were rotated by means of hand lever 101.

The two hydraulic cylinders 115 and 116 are so interconnected, as will be further described hereinbelow, that the upper cylinder 116 always moves to render the change inoperative before the cylinder 115 moves the safe position shut-down cam shaft 110. However, the hand lever 101 can be moved to rotate shaft 102 and render all of the chains inoperative without causing the hydraulic cylinder 116 to rotate the cam shaft 110.

Cylinders 115 and 116 together with a solenoid valve 118 occupy a separate section 119 of the main casing 62. The cylinders and solenoid valve 118 are supplied with fluid under pressure through an inlet pipe 121. The fluid exhausts through a similar pipe 122, both pipes leading to the solenoid valve. A pipe 123 extends from the solenoid valve 118 to each of the cylinders 115 and 116 and when the solenoid valve sends fluid under pressure through pipe 123 its connections to the cylinders are such that both piston rods are retracted. Retraction of the piston rods actuates the rack and pinion assemblies 114 and 117 to rotate the shafts 102 and 110 in such direction that all of the chains 71 and 73 are left in normal or operating position. When the solenoid valve 118 allows the fluid to exhaust from the cylinders through the pipe 123 back to the valve and supplies fluid under pressure through a pipe 124 the connections of the pressure pipe 124 to the two cylinders are such that both piston rods travel outwardly from their respective cylinders. The pipe 124 is free and unobstructed between the solenoid valve and the cylinder 116, with the result that the rack and pinion assembly 117 and shaft 102 are actuated promptly after the application of pressure to the pipe 124 for the purpose of displacing all of the pairs of endless chains 71 and 73 from the assemblies 63 and 64.

Flow of the fluid through pipe 124 to cylinder 115 is regulated by a hand valve 126 and may be stopped altogether by a "stop" valve 127. The stem of the stop valve 127 is in alignment with the rack of the rack-and-pinion assembly 117 and does not open until the piston of cylinder 116 reaches the end of its outward stroke, at which time the shaft 102 has turned far enough to displace all of the pairs of endless chains sufficiently from the mechanisms 63 and 64.

The fluid is then free to flow the remainder of the length of pipe 124, moving the piston rod of cylinder 115 outwardly and rotating shaft 110 by means of rack and pinion assembly 114, with the result that cams 111 act on levers 98 and turn each of the valve stems 57 in such direction that the corresponding hydraulic cylinders located on the gas-making set 3 are brought to a safe position for shut-down purposes. The hand valve 126 has sufficient throttling or slowing down action to prevent the cylinder 115 from violently moving the cams 111.

If the stop valve 127 were not present and if the shaft 110 bearing cams 111 were allowed to act before or as soon as the shaft 102 displaced the chains 71 and 73, breakage of the gear assemblies 63 and 64 might occur, because some roller cam 72 or 74 might at such time oppose the action of the corresponding cam 111.

Electric wires 128 and 129 for actuating the solenoid in solenoid valve 118 lead to push buttons (not shown) located at several points or stations about the water-gas set 3 whereby the set can be brought to safe shut-down position promptly if any emergency arises. The solenoid of the solenoid valve is conventional and the valve is an ordinary piston valve or balanced slide valve.

In order to prevent such manipulation of the valves of the water-gas set as might result in explosions, fires or the like, which might occur if the hand levers 95 were operated carelessly or by an inexperienced operator, interlocking lugs 132 are provided on the hand levers 95. Obviously, when the control device has been properly set and is operating correctly, these interlocking lugs 132 are functionless. However, it might for example be possible in the absence of such devices, for an operator to open the air blast valve 31 by moving the lever 95 corresponding thereto while the reversing valves 38 and 39 were in the wrong position, which would deliver air to the gas mains and might also cause a serious explosion.

Figure 6:
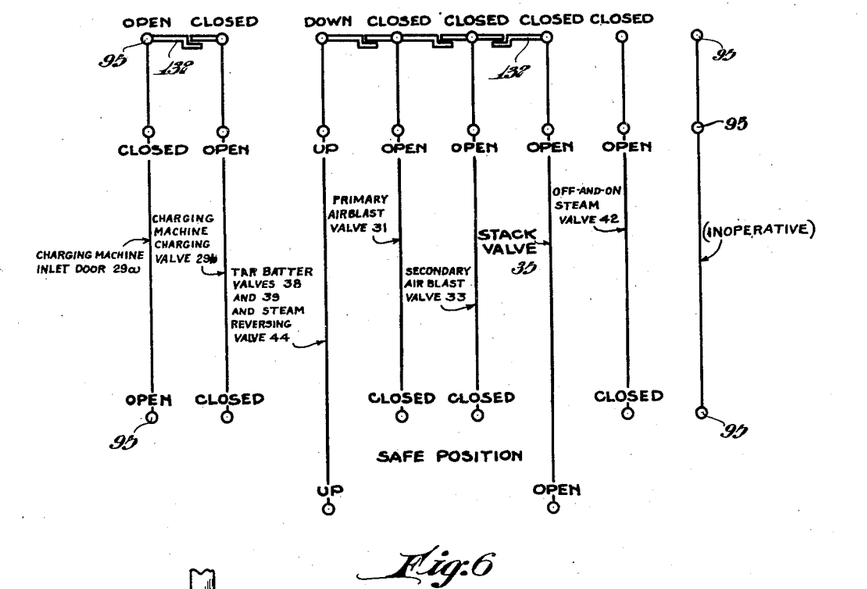
Fig. 6 is a diagram showing the interlocking of hand levers.

The overlapping of the lugs 132 on the levers 95 shown in detail in Fig. 6, which also illustrates diagrammatically the relation of the lugs 132 to the valves of the water-gas set 3. The legend of Figure 6 shows the valves of the water-gas set which are operated by the corresponding levers 95 or the chains corresponding thereto.

The diagram of Fig. 6 shows that the lugs 132 overlap each other in such order that the carburetter or secondary air blast valve cannot be opened when the stack valve is closed. Neither can the generator blast valve be opened when the reverse valve is in its downrun position. The carburetter blast cannot be opened before the generator blast is opened.

The lugs 132 on the two levers 95 corresponding to the valves 29a and 29b of the charging machine 6 so overlap that the charging valve 29b cannot be lowered or opened when the inlet door 29a is open.

The row of circles at the lower edge of Fig. 6 suggests the positions of the hand levers 95 when the water-gas set 3 is placed in safe shut-down position. Two of the levers 95, those corresponding to the stack valve 35 and to the valves 38, 39 and 44, respectively, are positioned opposite the remaining levers 95. That is, these two levers 95 are moved out or away from the casing 62 instead of towards it.

One assembly 63 is provided to operate the stack valve 35 and another to operate the valves 38, 39 and 44. An assembly 63 is shown in detail in Figs. 7, 8 and 9. The assemblies 63 are provided with special levers 112 attached to the corresponding bevel gear 66.

The cams 113 for these two gear assemblies 63 are placed on shaft 110 in alignment with the special levers 112 instead of with the levers 98 which are, even in the assemblies 63, connected to the long vertical rods 97 and hand levers 95.

The effect of having the cams 113 act on the special levers 112 in the gear assemblies 63 is to elevate the levers 98 and long rods 97 and move hand levers 95 outward from casing 63, thus opening the stack valve 35, and placing the valves 38, 39 and 44 in the positions in which they are shown in Fig. 1.

All of the "standard" assemblies 64 are arranged as shown in Fig. 10 with the cams 111 engaging the levers 98 and moving the long rods 97 attached thereto downward. This moves the corresponding hand levers 95 toward the casing 62 when the corresponding safe shut-down cams 111 act.

The reason for operating two of the valve stems 57 differently than the others and for having the two corresponding hand levers 95 positioned outwardly from the casing 62 when in shut-down position is to make it possible to place interlocking lugs 132 on the levers 95. That is, if the valve stem assemblies were all of the "standard" type, such as 64, and if the levers 95 were all arranged to be in a straight line when the set 3 is in a safe shut-down position, it would be found by actual trial impossible to apply lugs 132 to levers 95 and have them overlap for any useful purpose. Such interlock systems are discussed more at length in the patent to Stone 1,353,977, Sept. 28, 1920.

Figure 14:
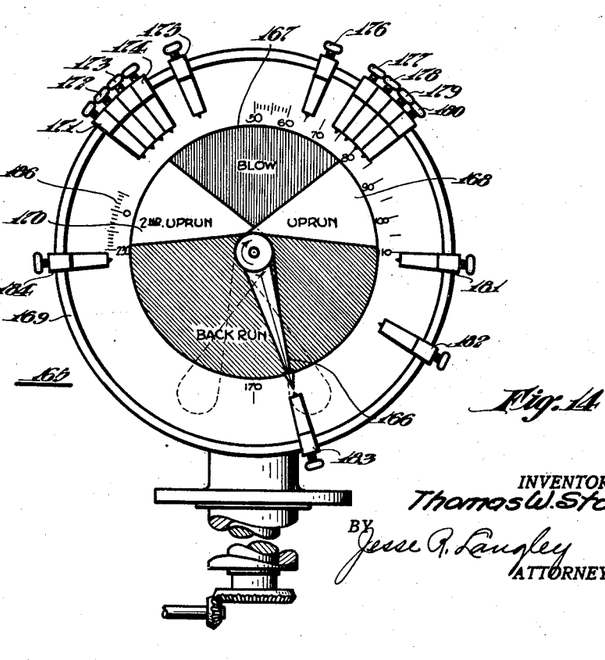
Fig. 14 is an enlarged view of the cycle indicator.
Figure 15:
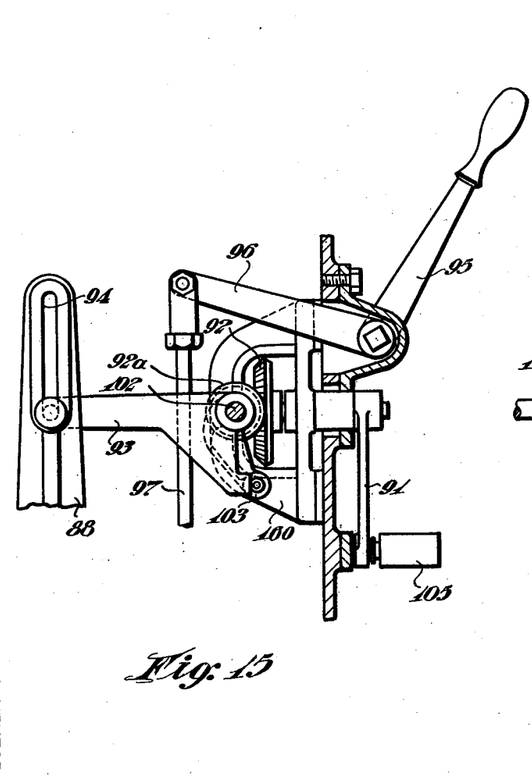
Figs. 15 and 16 are enlarged vertical sectional and elevational views, respectively, of a portion of the apparatus shown in Figs. 2, 3 and 4, parts being shown broken away in Fig. 16.

Any one of the several chains 71 or 73, even while in motion, may be advanced or retarded by hand by removing a corresponding lock 140 from one of the openings 141 in the front of the casing 62 and inserting a crank or key through the opening 141 shown in Fig. 3 and turning the corresponding shaft 143 shown in Figs. 14 and 11. The turning of any shaft 143 and a worm 144 mounted thereon moves the correspondingly normally stationary worm wheel 82 of the corresponding differential assembly 77 to advance or retard the rotation of the corresponding sprocket wheel 76 with respect to the rotation of the shaft 78, and thus advance or retard the point in the cycle at which the roller cam 72 or 74 engages its corresponding lever 67 or 69 to operate one of the reversing valves 52.

An important advantage of my invention is that such adjustment may be made at any time in the cycle, without interrupting the operation of the device in any way.

The worm 144 for adjusting one of the sprockets 76 in each assembly 77 is placed at a high elevation while the corresponding worm 144 for the other sprocket 76 in the same assembly 77 is located in a relatively low position. The alternate high and low positions of the worms 144 and shafts 143 enables the holes 141 in the front of the casing 62 to be placed in two superposed rows.

Rotation of the shafts 143, as shown in enlarged detail in Fig. 12, is also transmitted through dial gearing assemblies 147, each of which comprises three pairs of reduction gears 150, 151 and 152 and moves a pointer 148 on a dial 146. Since the shafts 143 having worm 144 mounted thereon occur at two different levels, the dial gearing assemblies 147 occur at two levels and the dials 146 for pointers 148 appear at two levels on the front of the machine, as seen in Figs. 2 and 3.

One of the gears of the reduction train of gears 79 is removable and can be replaced with any one of a set of gears, not shown, of different sizes for turning the shaft 78 and sprocket wheels 76 at different rates of speed and thereby operating the gas-making set 3 on cycles of different lengths.

Change gears for 3½, 4, 4½, 5 and 5½ minutes are usually furnished.

Figure 13:
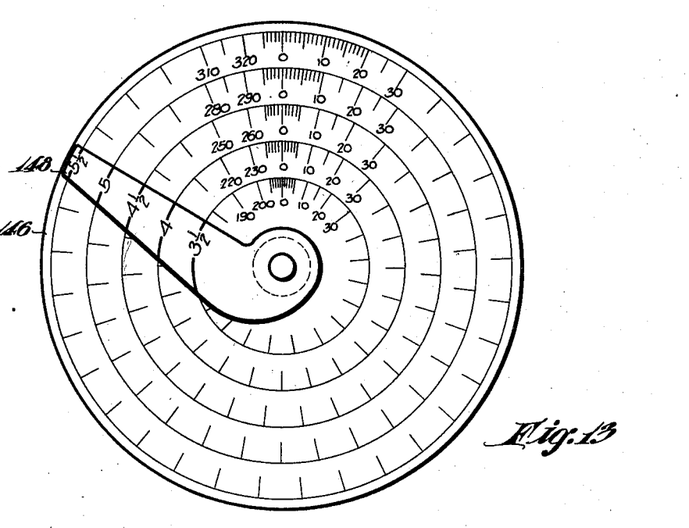
Fig. 13 is an enlarged view of a dial.

The dials 146 are all alike and an enlarged view of one of them is shown in Fig. 13. There is a separate series of graduations for each length of cycle. That is, the different graduations correspond to the different change gears supplied for the train of gears 79.

The pointers 148, of which sixteen are shown in Fig. 2 and of which one is shown enlarged in Fig. 13, have markings ranging from 3½ near the center to 5½ near the periphery. The dials 146 have a corresponding plurality of graduated circles ranging from 210 nearest the center to 330 at the periphery. When the proper change gear is inserted in the gear train 79 to give a cycle that is 4½ minutes in length, for example, it is then only necessary to read the graduations in seconds on the circle that is opposite the 4½ mark on the pointer to learn the progress in its cycle of the cam roller 72 or 74 on the corresponding chain.

It should be noted that one pointer 148 and one dial 146 do not give the full particulars regarding one valve, but show the exact timing to the nearest second for one particular movement only of the valve. One dial of any given pair will show the timing of the opening of a corresponding valve or part of the gas-making set, and the other dial will show the closing of the same valve. A pair of dials as above defined are located with one directly over the other one showing the point at which the cam roller 72 engages the lever 67 to move the valve in one direction and the other the point at which the roller cam 74 engages the lever 69 to reverse the valve.

The ratio of the train of gearings that constitutes one of the dial gearing assemblies 147 shown in Fig. 4 and shown enlarged in Fig. 12 is such that movement of the roller cam 72 or 74 over the entire length or periphery of the corresponding chain 71 or 73 by turning of the shaft 143 produces exactly 360° of rotation of the pointer 148 on the dial. This may easily be seen if it is assumed that in assembling the machine, all of the chain cams are brought to similar positions.

Assume that with the chains in this position all of the pointers 148 are assembled in front of the dials 146 at the zero positions. Should any given chain be advanced by means of the corresponding shaft 143 and differential assembly 77, it can readily be seen that since both the differential assembly 77 and the dial gearing assembly 147 are driven from the same shaft 143, that the corresponding pointer 148 would be moved in proportion to the movement of the roller cam on that particular chain.

The above corresponding movements of the chain roller cams and the pointers would not only hold true when the driving motor 80 and the main drive shaft 78 were stationary, but would likewise hold true when the main drive shaft 78 is in rotation. The gear ratios of all of the differential assemblies 77 are alike and any movement of main drive shaft 78 always produces an equal amount of travel in all of the chain risers.

The ratio of gearing in the train of gearing 79 is not the sole reduction between the speed of rotation of the motor and the sprocket wheels 76. The planetary gears of each of the differential assemblies do not divide the motion in a 50—50 ratio as do the differentials in automobile rear axles, but are unsymmetrical. Each differential 77 is itself a reduction train of gears, the ratio of the reduction being the same as the relative diameters of the spur gears 84 geared to shaft 78 and the ring gears 85 bolted to sprocket wheel 76. The sprocket gears 76 rotate slower than shaft 78 and in the opposite direction. The total speed reduction is the sum of the reduction in the single train of gears 79 added to the ratio of the corresponding one of the differential assemblies 77.

The casing 62 comprises in part a six unit section having six pairs of endless chains for operating the hydraulic cylinders that open and close the valves 31, 33, 35, 38, 39, 42 and 44 of the water-gas set 3 to maintain the intermittent cycle of the set. It also comprises a two-unit section having two pairs of chains which suffice to control the two hydraulic cylinders that operate the valves 29a and 29b of the charging machine 6 of the gas-making set 3.

The shaft 78 having the differential assemblies 77 mounted thereon is suspended from the top of the casing 62 by means of brackets 156. Brackets 157 extend from the rear side of the casing 62 and support the pivots 89 for the long levers 88. Assemblies 63 and 64 are supported by brackets 158 which also support cam shaft 110. The dial gearing assemblies 147 are supported by brackets 153. The worms 144 that are located at the lower level are supported by brackets 159, as shown in Fig. 4.

The pairs of bevel gears 92 and the shaft 102 are supported by brackets 160.

A cycle indicator 165 is mounted above and driven from the train of gears 79 and is shown enlarged in Fig. 14. It is provided with a pointer 166 which rotates in a clockwise direction. The dial is preferably provided with a red sector 167 marked "Blow" in Fig. 14 over which the pointer 166 travels during the air blow period of the cycle; a white sector 168 marked "Uprun" over which the pointer 166 travels during the uprun steam period of the gas-making set 3; a green sector 169 marked "Backrun" in Fig. 14, over which the pointer travels during the backrun period of the cycle of the gas-making set that is under control, and a second white sector 170 marked "2nd Uprun" over which the pointer travels during the second uprun portion of the cycle. The colored sectors may be adjusted to agree with the indications of the pointers 148 on dials 146.

Fourteen small markers 171 to 184, inclusive, the shown attached to the edge of the dial 165.

As the pointer 166 passes the fourteen markers in turn the movements of valves such as 42, 31 and 35 of set 3 take place as suggested by the following tabulation:

| Marker passed by pointer 166 on dial 165, Fig. 14 | Corresponding valve movement of set 3, Fig. 1 |
|---|---|
| 171 | Close off-and-on steam valve 42. |
| 172 | Open generator air-blast valve 31. |
| 173 | Open stack valve 35. |
| 174 | Open secondary air blast valve 33. |
| 175 | Open charger inlet door 29a. |
| 176 | Close charger inlet door 29a. |
| 177 | Close secondary air-blast valve 33. |
| 178 | Close generator air-blast valve 31. |
| 179 | Open off-and-on steam valve 42. |
| 180 | Close stack valve 35. |
| 181 | Reverse valves 38, 39 and 44. |
| 182 | Open charging valve 29b. |
| 183 | Close charging valve 29b. |
| 184 | Reverse valves 38, 39 and 44. |
| 171 | Close off-and-on steam valve 42. |

Each marker 171 to 184, inclusive, bears a legend as installed on the dial that corresponds to items of the above tabulation.

When the pointer 166 passes the marker 171 one of the roller cams on one of the endless chains in casing 62 is closing steam valve 42 shown in Fig. 1 on water-gas set 3. As the pointer 166 passes the remaining markers the roller cams 72 and 74 of the endless chains 71 and 73 open and close the valves of the water-gas set 3 in the order indicated by the tabulation.

The passing of the four markers 171 to 174, inclusive, shows that appropriate endless chains and roller cams thereon have changed the operation of the set from the "2nd uprun portion" of the cycle to the "blow" part of the cycle.

The pointer 166 passes the marker 172 before it passes 173. This indicates that the cycle includes a "purge" period for saving gas contained in the set 3 at the time the "blow" period starts.

The travel of the pointer 166 past the markers 171 to 184, inclusive, does not cause the corresponding hydraulic cylinder to operate. That is caused by the opening and closing of the valves in group 2 which in turn are opened and closed by the endless chains in automatic control set 1. For convenience the operator adjusts the colored sectors of the indicator dial 165 and the markers at their periphery to agree with the progress of the cycle of the water-gas set 3 as brought about by the roller cams on the endless chains located in the casing 62 of automatic control 1.

A dial 186, graduated in seconds, is shown at the periphery of the colored sectors 167 to 170, inclusive. Differently graduated dials 186 may replace the one shown to make the number of seconds marked thereon agree with the length of cycle on which the automatic control is operating. The graduations also agree with one of the five rows of graduations on the dials 146.

The graduated dial 186 is especially useful in starting a new automatic control installation or in initiating a new cycle. The pointers 171 to 184, inclusive, are spaced about dial 186 in accordance with the number of seconds in each portion of the cycle contemplated. The several endless chains 71 and 73 are adjusted by means of differential assemblies 77 until the corresponding pointers 148 on the dials 146 agree with the readings of the pointers 171 to 184 on the dial 186. The automatic control system can then be started if the gas generating set has been made ready.

It is possible to close any valve immediately after it is opened without waiting until other valves have been closed. In other words there is no favored or fixed sequence of operation inherent in the apparatus.

The exact relation and length of the various parts of a given cycle and the relative advantages of different cycles forms no part of the present invention. One typical cycle is outlined for illustrative purposes to show how the gas-making set 3 is controlled by the automatic control mechanism 1.

One of the advantages of my invention is the promptness with which the valve stems 57 are turned.

The total length of travel of any roller cam 72 or 74 is very large, compared with the distance that it travels while in contact with and moving one of the arms 67 or 69 of an assembly 63 or 64. Since the roller cam necessarily travels one full chain length during each cycle it has to travel fairly rapidly and the arms attached to bevel gears 66 and 68 are moved very promptly.

Since the total periphery of the chain is so large, any advancement or retardation of the same results in a relatively very minute time interval adjustment. Or conversely, a small time adjustment does not necessitate a mechanical displacement of impossibly small dimensions.

The great length of the endless belts or chains 71 and 73, compared to the periphery or circumference of the drive sprockets 76, also permits reasonably rapid rotation of the drive shaft 78 and differential assemblies 77. These parts therefore do not need to be of excessive weight.

Moreover, the bevel gears 66 and 68 in each valve stem turning assembly 63 or 64 are much larger than the bevel gear 65 mounted directly on the end of valve stem 57. The result is that the angular speed of rotation of the bevel gear 65 and valve stem 57 is accelerated with respect to the speed of rotation or oscillation of bevel gears 66 and 68.

One more of the advantages of my invention is the facility with which the timing of any one operation of the cycle can be made without changing the timing of any other portion. For example, the changing of the time of opening of any given valve through the corresponding differential gear assemblage does not even disturb the time of closing that same valve because each valve is under the control of two endless chains, one for opening and one for closing the same.

Purges and blow runs and other features of certain cycles make it necessary to open and close a given valve of certain water-gas sets twice during each cycle. When the endless chain automatic control system of my invention is connected to such a gas-making set, the pair of chains that is assigned to the work of controlling the hydraulic cylinder of the valve that is to be operated, that is to say, opened and closed twice during each cycle of the gas-making set, is provided with two roller cams on each chain. That is, a total of four roller cams is provided for the pair of endless chains.

The pair of dials 146 that correspond to the two endless chains that have two roller cams 72 or 74 apiece are then each provided with two pointers. The angle between the two pointers on one dial corresponds to the spacing apart of the two roller cams 72 or 74 on the corresponding endless chain 71 or 73 of the pair. Any adjustment made by means of the differential assembly 77 necessarily advances or retards the two chain lugs on the one chain simultaneously. A coarse adjustment is made by placing the two roller cams 72 or 74 the correct distance apart on the chain, and the finer adjustment made through the differential assembly 77 by turning the proper shaft 143 is directed to that particular opening or closing of the cylinder, the timing of which is most important.

Numerous other changes in the arrangement of the parts of my automatic control apparatus are possible without exceeding the scope of my invention as herein claimed. It is characteristic of my automatic control that it is easily adapted for the operation of gas-making sets requiring unusual cycles, and that characteristic is one of its advantages.

I claim as my invention:

1. In combination, a gas manufacturing apparatus having sequence-operated valves, motive means for said valves, pilot mechanisms for controlling said motive means, a control shaft driven at uniform speed, and cam devices operatively connected to said shaft and adapted to engage said pilot mechanisms at intervals greater than one revolution period of said shaft, whereby said motive means may be caused to operate said valves in predetermined sequence.

2. In combination, a gas manufacturing apparatus having sequence-operated valves, motive means for said valves, pilot mechanisms for controlling said motive means, a control shaft driven at uniform speed, a plurality of sprockets carried by said shaft, and a plurality of endless chains in engagement with said sprockets and carrying projections adapted to traverse cyclic paths in which they engage and operate said pilot mechanisms, whereby said motive means may be caused to operate said valves in predetermined sequence.

3. In combination, a gas manufacturing apparatus having sequence-operated valves, motive means for said valves, pilot mechanisms for controlling said motive means, a control shaft driven at uniform speed, cam mechanisms operatively connected to said shaft and adapted to engage said pilot mechanisms at intervals greater than one revolution period of said shaft, and planetary gear mechanism located between said shaft and said cam mechanisms and adapted to advance or retard the position of said cam mechanisms with respect to each other and the rotation of the shaft, whereby the times of engagement of the cam mechanisms with the individual pilot mechanisms and the times of operation of the corresponding valves may be varied without affecting the other pilot mechanisms and valves.

4. In combination, a gas manufacturing apparatus having sequence-operated valves, motive means for said valves, pilot mechanisms for controlling said motive means, a control shaft driven at uniform speed, cam devices operatively connected to said shaft and adapted to engage and operate said pilot mechanisms, and planetary gear mechanisms located between said cam devices and said shaft and adapted to advance or retard the cam mechanisms with respect to each other and the rotation of said shaft, whereby the times of engagement of the cam mechanisms with the individual pilot mechanisms and the times of operation of the corresponding valves may be varied without affecting the other pilot mechanisms and valves.

5. In combination, a gas manufacturing apparatus having sequence-operated valves, motive means for said valves, pilot mechanisms for controlling said motive means, a control shaft driven at uniform speed, a pair of cam devices adapted to engage each of said pilot mechanisms and operate the same in opposite directions, and planetary gear mechanisms located between each of said cam devices and said shaft and adapted to advance or retard said cam device with respect to each other and the rotation of the shaft, whereby each operation of each of said pilot mechanisms and the corresponding valve may be varied independently of any other operation of the same or any other pilot mechanism or valve.

6. In combination, a gas manufacturing apparatus having sequence-operated valves, motive means for said valves, pilot mechanisms for controlling said motive means, a control shaft driven at uniform speed, a pair of cam devices adapted to engage each of said pilot mechanisms and operate the same in opposite directions, whereby said valves may be caused to be reversed in predetermined sequence.

7. In combination, a gas manufacturing apparatus having sequence-operated valves, motive means for said valves, pilot mechanisms for controlling said motive means, a control shaft driven at uniform speed, a pair of cam devices adapted to engage each of said pilot mechanisms and operate the same in opposite directions, and planetary gear mechanisms located between said pairs of cam devices and said shaft and adapted to advance or retard said cam mechanisms with respect to the rotation of the shaft, whereby the times of operation of the individual pilot mechanisms and the corresponding valves may be varied without affecting the other pilot mechanisms and valves.

8. In combination, a gas manufacturing apparatus having sequence-operated valves, motive means for said valves, pilot mechanisms for controlling said motive means, a control shaft driven at uniform speed, a pair of followers differentially geared to each of said pilot mechanisms, corresponding pairs of cam devices adapted to engage said followers, respectively, and operate said pilot mechanisms in opposite directions, and planetary gear mechanism between each of said cam devices and said shaft and adapted to advance or retard said cam devices with respect to each other and to the rotation of the shaft, whereby each operation of each of said pilot mechanisms and the corresponding valve may be varied independently of any other operation of the same or any other pilot mechanism or valve.

9. In combination, a gas manufacturing apparatus having sequence-operated valves, motive means for said valves, pilot mechanisms for controlling said motive means, a control shaft driven at uniform speed, a plurality of gears mounted on said shaft, a corresponding plurality of adjustably mounted planetary gear structures having pinions meshed with said shaft gears, and cam devices oppositely meshed with said pinions and adapted to engage and operate said pilot mechanisms, whereby said planetary gear structures may be so positioned as to vary the times of engagement of the individual cam devices with the corresponding pilot mechanisms without affecting the times of engagement of the other cam devices with their corresponding pilot mechanisms.

10. In combination, a gas manufacturing apparatus having sequence-operated valves, motive means for said valves, pilot mechanisms for controlling said motive means, a control shaft driven at uniform speed, pairs of cam devices driven by said shaft, reversing gear structures for operating said pilot mechanisms and having pairs of differentially geared followers adapted to be engaged by said cam devices, whereby displacement of any one of said followers from the path of the corresponding cam device causes the other follower of the same pair to be moved into the path of its corresponding cam device, and vice versa.

11. In combination, a gas manufacturing apparatus having sequence-operated valves, motive means for said valves, pilot mechanisms for controlling said motive means, a control shaft driven at uniform speed, a plurality of pairs of cam devices, planetary gear mechanisms located between said cam devices and said shaft and adapted to advance or retard said cam devices with respect to each other and to said shaft, and a plurality of pairs of followers differentially geared to said pilot mechanisms and adapted to be engaged by said pairs of cam devices to operate said pilot mechanisms in opposite directions, whereby the time of any operation of any of said pilot mechanisms and its corresponding valve may be varied without affecting any other operation of the same or other pilot mechanisms and their corresponding valves.

12. In combination, a water gas set, a plurality of operating valves therefor, motive devices for said valves and pilot mechanisms for controlling the operation of said motive devices, a plurality of cam devices adapted to engage and operate said pilot mechanisms in predetermined sequence, means for moving said cam devices out of operative position with respect to said pilot mechanisms, and separate means for concomitantly operating said pilot mechanisms to cause said valves to assume predetermined positions.

13. In combination, a water gas set, a plurality of operating valves therefor, motive devices for said valves and pilot mechanisms for controlling the operation of said motive devices, a plurality of cam devices adapted to engage and operate said pilot mechanisms in predetermined sequence, means for moving said cam devices out of operative position with respect to said pilot mechanisms, and manually operable devices for operating said pilot mechanisms when said cam devices have been moved out of operation with respect thereto.

14. In combination, a gas manufacturing apparatus having sequence-operated valves, motive means for said valves, pilot mechanisms for controlling said motive means, a control shaft driven at uniform speed, a plurality of endless chains driven by said shaft, risers mounted on said chains and adapted to engage and operate said pilot mechanisms when said chains are in their normal operating positions, and means for swinging said chains to move said risers out of operative position with respect to said pilot mechanisms.

15. In combination, a gas manufacturing apparatus having sequence-operated valves, motive means for said valves, pilot mechanisms for controlling said motive means, a control shaft driven at uniform speed, cam devices operatively connected to said shaft and adapted to engage and operate said pilot mechanisms, and planetary gear mechanisms located between said cam devices and said shaft and adapted to advance or retard the corresponding cam mechanisms with respect to each other and to said shaft.

16. In automatic sequence valve control apparatus for a water gas set, pilot mechanisms adapted to control the valves of said set, a shaft rotating at uniform speed, a plurality of sprockets driven by said shaft, a second plurality of sprockets adapted to be positioned adjacent to said pilot mechanisms, endless chains carried by said sprockets, risers on said chains adapted to engage and operate said pilot mechanisms when said chains are in their normal operating positions, and means for moving said second named sprockets to throw the chain risers out of engagement with the corresponding pilot mechanisms.

17. In automatic sequence control for a water gas set valve, a pilot mechanism for controlling the operation of said valve, a control shaft, a pair of cam devices driven by said shaft, a corresponding pair of followers oppositely geared to said pilot mechanism, each follower being adapted to be engaged and moved by one of said cam devices and to be moved in an opposite direction when the other follower is engaged by its corresponding cam device, whereby, except during periods of movement of said followers, one of said followers is caused to be in the path of its corresponding cam device at all times.

18. In combination, a gas manufacturing apparatus having sequence-operated valves, motive means for said valves, pilot mechanisms for controlling said motive means, a control shaft driven at uniform speed, a plurality of endless chains driven by said shaft, risers mounted on said chains and adapted to engage and operate said pilot mechanisms when said chains are in their normal operating positions, means for swinging said chains to move said risers out of engagement with said pilot mechanisms, and separate means for operating said pilot mechanisms in unison to place said valves in predetermined safe positions.

19. In combination, gas manufacturing apparatus having sequence-operated valves, motive devices for said valves, pilot mechanisms for controlling the operation of said motive devices, driven cam devices normally adapted to engage and operate said pilot mechanisms, power-actuated means for moving said cam devices out of operative position with respect to said pilot mechanisms, power-actuated means for operating said pilots to cause said valves to be placed in predetermined positions, and means for interrupting the application of power to said second-named means until said first-named means has acted to move said cam devices out of operative position with respect to said pilot mechanisms.

20. In combination, a gas-manufacturing apparatus having sequence-operated valves, motive means for said valves, pilot mechanisms for controlling said motive means, a control shaft driven at constant speed, and cam devices operatively connected to said shaft and adapted to effect the operation of said pilot mechanisms at intervals greater than one revolution period of said shaft, whereby said motive means may be caused to operate said valves in predetermined sequence.

21. In combination, a gas-manufacturing apparatus having sequence-operated valves, motive means for said valves, pilot mechanisms for controlling said motive means, a control shaft driven at constant speed, and cam devices operatively connected to said shaft and adapted to effect the operation of said pilot mechanisms, and means for varying the angular relation between said control shaft and one or more of said cam devices.

THOMAS W. STONE.